(12) United States Patent
Augustin

(10) Patent No.: US 7,534,327 B2
(45) Date of Patent: May 19, 2009

(54) DEVICE FOR RECOVERING DRINKING WATER FROM CONDENSATE AS WELL AS A METHOD AND A DEEP-DRAWING DIE FOR PRODUCTION OF SAID DEVICE

(76) Inventor: Stephan Augustin, Tengstrasse 45, München (DE) 80796

( * ) Notice: Subject to any disclaimer, the term of this patent is extended or adjusted under 35 U.S.C. 154(b) by 774 days.

(21) Appl. No.: 10/493,373

(22) PCT Filed: Nov. 7, 2002

(86) PCT No.: PCT/EP02/12441
§ 371 (c)(1),
(2), (4) Date: Sep. 27, 2004

(87) PCT Pub. No.: WO03/040040
PCT Pub. Date: May 15, 2003

(65) Prior Publication Data
US 2005/0098423 A1    May 12, 2005

(30) Foreign Application Priority Data
Nov. 9, 2001    (DE) ............................... 101 55 080

(51) Int. Cl.
*B01D 1/30*    (2006.01)
*B01D 3/32*    (2006.01)
*B28B 1/00*    (2006.01)
(52) U.S. Cl. ................... 203/99; 202/202; 202/270; 203/100; 203/DIG. 22; 210/295; 210/774; 425/175; 425/817 R
(58) Field of Classification Search ............... 159/904, 159/DIG. 15; 202/83, 200, 202, 234, 266, 202/267.1; 203/10, 86, 99, 100, DIG. 1, 203/DIG. 17, DIG. 22; 210/153, 295, 774; 425/110, 175, 817 R
See application file for complete search history.

(56) References Cited
U.S. PATENT DOCUMENTS
2,848,389 A    8/1958    Bjorksten
2,865,138 A    12/1958    Eidman et al.

(Continued)

FOREIGN PATENT DOCUMENTS
DE    30 15 254 A1    10/1981

(Continued)

*Primary Examiner*—Virginia Manoharan
(74) *Attorney, Agent, or Firm*—Jenkins, Wilson, Taylor & Hunt, P.A.

(57) ABSTRACT

A device for recovering drinking water from condensate includes a self-supporting moulded part 11 formed of a transparent synthetic resin such as PET or PC, which is resistant to UV radiation. The moulded part 11 presents an open bottom area 16 with a collecting channel 15 on the edge side, with the collecting channel 15 presenting an inner wall 18 oriented towards the circumferential surface 12 and serving, at the same time, as floating aid, and with the moulded part 11 being provided with a pouring opening in its upper section 13. For the manufacture of this device, a vacuum is created in a special deep-drawing tool not only in the region of the circumferential surface to be produced but also in the region of the collecting channel to be formed, and the moulded part is separated from a separated deep-drawing tool element outside the zone of the collecting channel.

21 Claims, 10 Drawing Sheets

U.S. PATENT DOCUMENTS

| | | |
|---|---|---|
| 3,290,230 A | 12/1966 | Kobayashi |
| 3,336,206 A | 8/1967 | Sasaki et al. |
| 3,932,080 A * | 1/1976 | Uemura et al. ............... 425/71 |
| 3,973,602 A * | 8/1976 | Kruse ........................ 141/95 |
| 4,036,209 A * | 7/1977 | Press ........................ 202/234 |
| 4,495,034 A * | 1/1985 | Lucas ........................ 202/181 |
| 4,966,655 A | 10/1990 | Wilkerson, Jr. |
| 6,830,654 B1 * | 12/2004 | Salmisuo ..................... 159/49 |
| 7,258,767 B2 * | 8/2007 | Ter Beek et al. .............. 203/10 |

FOREIGN PATENT DOCUMENTS

| | | |
|---|---|---|
| DE | 38 20 744 A1 | 12/1989 |
| GB | 2166 965 A | 5/1986 |

* cited by examiner

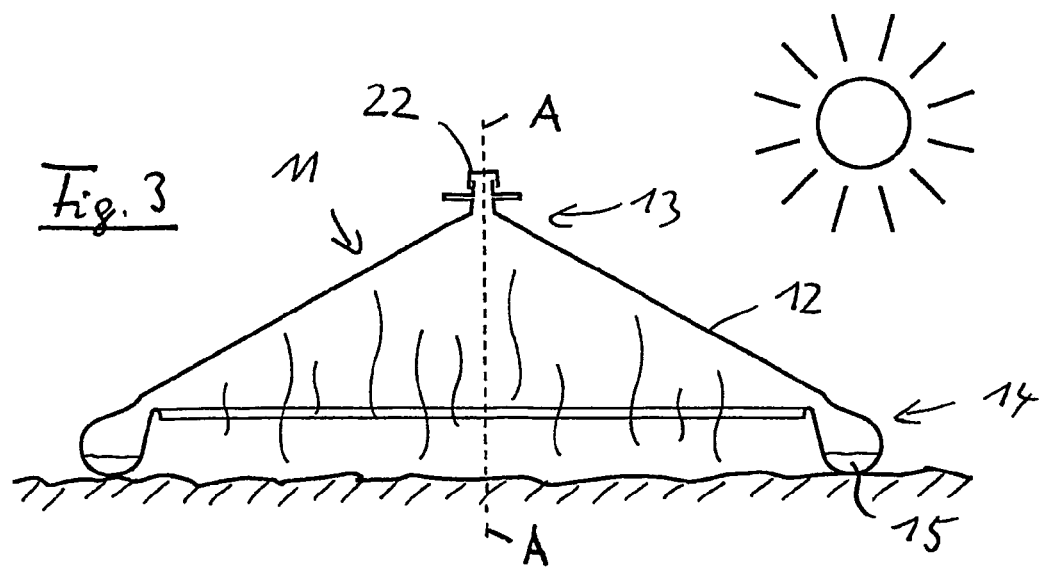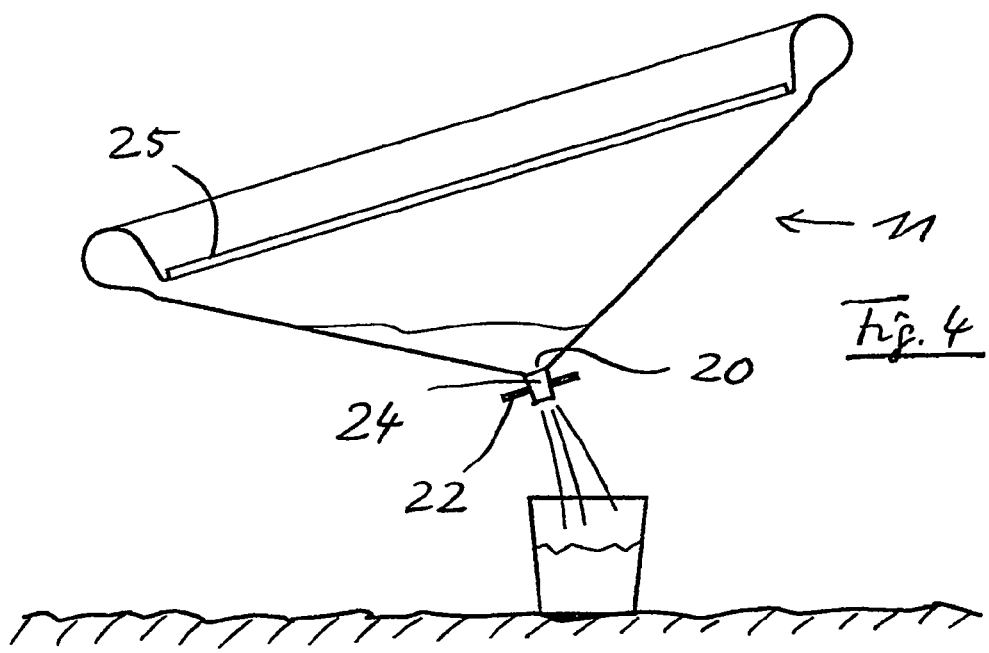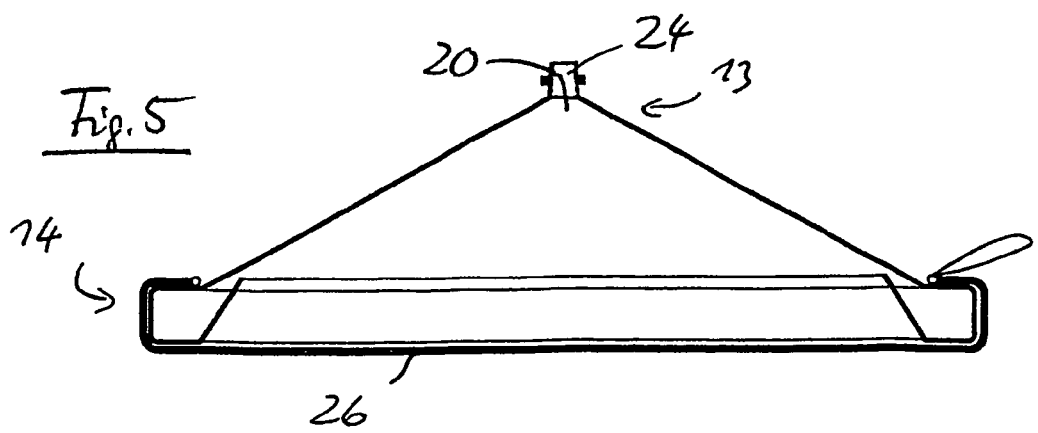

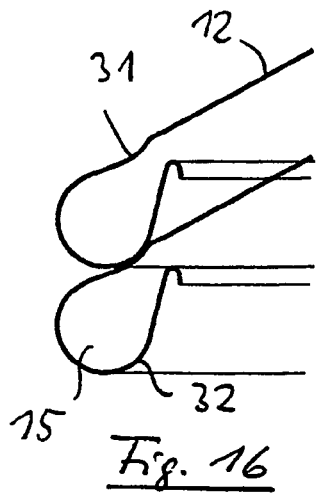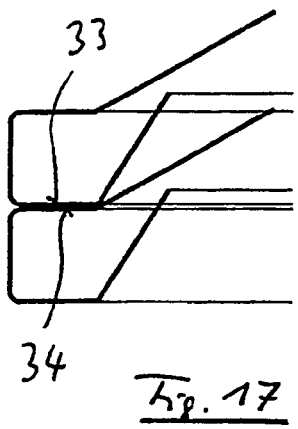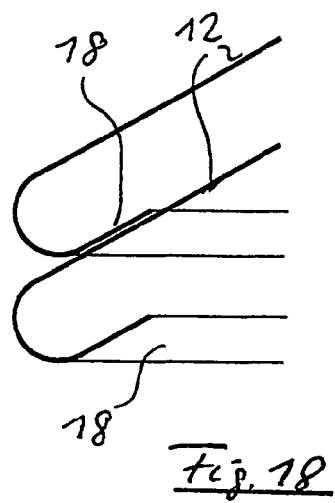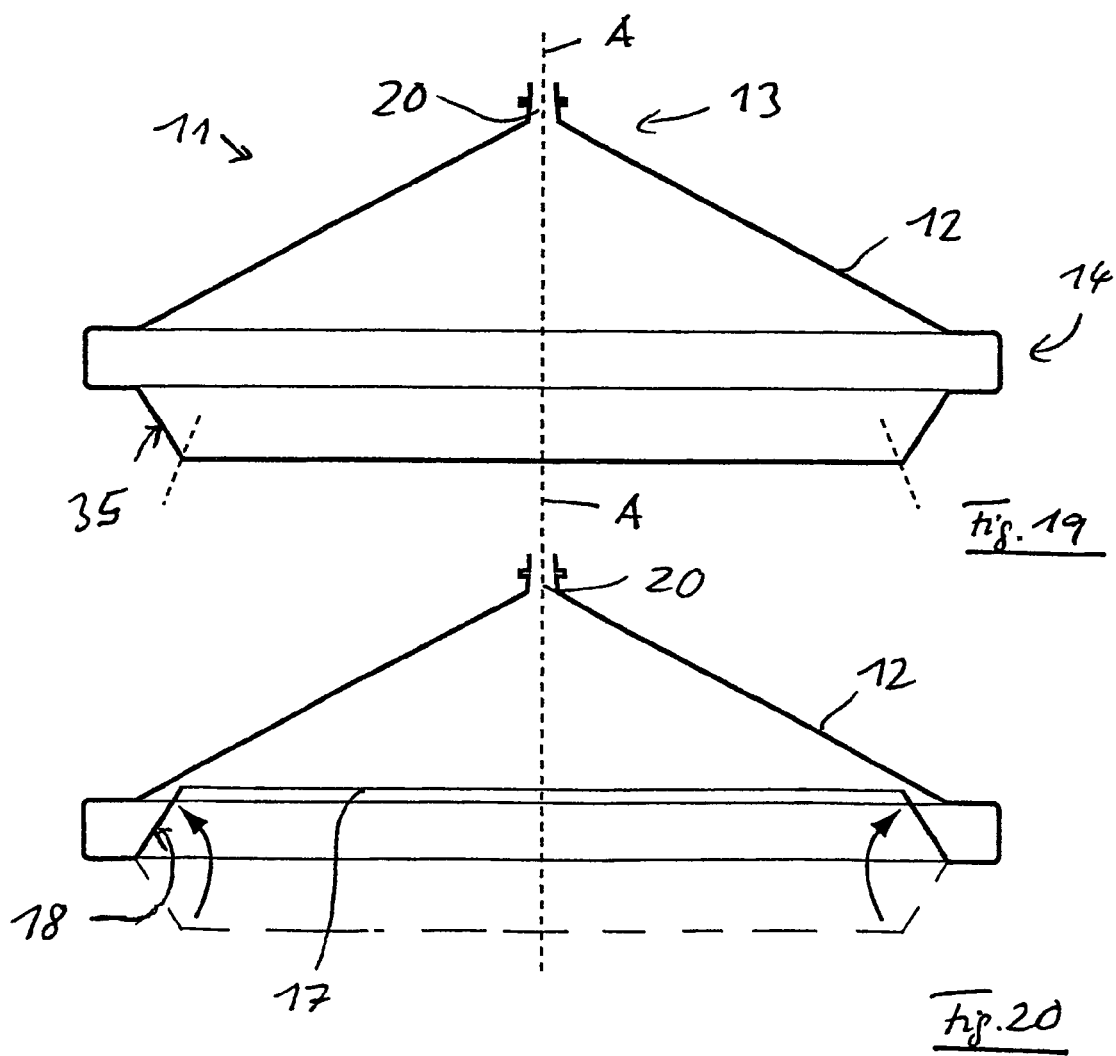

DEVICE FOR RECOVERING DRINKING WATER FROM CONDENSATE AS WELL AS A METHOD AND A DEEP-DRAWING DIE FOR PRODUCTION OF SAID DEVICE

RELATED APPLICATIONS

The presently disclosed subject matter claims the benefit under 35 U.S.C. § 371 of International Patent Application Ser. No. PCT/EP02/012441, filed Nov. 7, 2002; the disclosure of which is incorporated herein by reference in its entirety.

1. Technical Field

The present invention relates to a device for drinking-water recovery from condensate, as well as to a method of manufacturing this device and a deep-drawing tool for carrying through this method.

The present invention particularly involves a device suitable for water-borne applications, specifically at sea, and applications ashore for collecting water as condensate, that has evaporated under the influence of solar radiation. Within the general framework of this envisaged application, a seawater desalination, operated on solar energy, is envisaged, too.

2. Background Art

Mobile inflatable seawater desalination devices have been known already for cases of emergency in the marine, which comprise an inflatable PVC ring as floating base and a separate conical transparent PVC sheet over this floating base, which serves as condensation surface. There, the condensate is collected between the outside of the ring and the inside of the cone, with the sheet cone, which is dimensionally unstable, being maintained in the required shape by means of supporting rods.

What must be considered to be a disadvantage in that known device is the fact that the sheets are easily damaged and may easily be perforated in particular. Moreover, a structure including rods is extremely troublesome and requires an appropriate assembly in order to avoid malfunctioning. The manufacture of the individual parts of the device is comparatively expensive and there are also disadvantages in terms of handling with respect to cleaning of the sheets due to their flexibility. Apart therefrom the sheets can be exposed to mechanical loads within limits only and are sensible to outside weather conditions such as wind and rain. Finally, the discharge of the collected condensate is inconvenient and problematic because the condensate must be poured out via the underside of the device while some condensate may also be lost.

The U.S. Pat. No. 3,415,719 discloses a foldable device for the recovery of condensed water that is operated on solar energy, which consists of an inflatable transparent plastic body in which a collector receptacle permeable to water vapour is provided as bottom element for collecting the condensate, which device is to be placed on a water body. The aforementioned disadvantages apply substantially to this device, too, specifically the problems in terms of handling and dimensional stability.

The document WO 00/03779 discloses a device for recovery of condensed water, which comprises a conical bonnet whose lower end presents an integral inward fold to form a collecting channel and for receiving a bottom plate with an evaporating arrangement. This evaporating plate is surrounded by an additional buoyancy ring. In addition to the aforementioned disadvantages, the expensive manufacture of this device with an inflatable floating ring, the complex configuration of the evaporating plate, as well as their assembly to create a ready-to-use device must be considered to constitute a further disadvantage.

SUMMARY OF THE INVENTION

The present invention is hence based on the problem of providing a device of the type outlined by way of introduction, as well as a method of manufacturing same and a deep-drawing tool for carrying through the method, which presents a comparatively simple structure and permits an easy and unproblematic handling or manufacture, respectively, with a high efficiency.

In accordance with the invention, this problem is solved by a device for recovering drinking-water from condensate. Such a device can include a bonnet-shaped self-supporting moulded part made of a transparent synthetic resin such as PET or PC, which is resistant to ultraviolet (UV) radiation, the moulded part having in its lower section an open bottom area with a collecting channel on a side of an edge thereof, the collecting channel having an inner wall oriented towards a circumferential surface, and the moulded part having a pouring opening in its upper section.

The presently disclosed subject matter further provides a method of manufacturing such a device involving the steps of arranging a heated sheet of a thermoplastic transparent synthetic resin with a sealing on an edge side on a deep-drawing tool, applying a vacuum in the deep-drawing tool in a zone of a circumferential surface to be formed on the moulded part and additionally in a zone of a collecting channel to be formed, removing the moulded part from the mould together with a deep-drawing tool element that is located in the zone of the collecting channel to be formed, and separating the moulded part from the separated deep-drawing tool element outside the zone of the collecting channel.

Further still, the presently disclosed subject matter provides a deep-drawing tool for carrying through the above method, the tool including a principal section in which a cavity is provided for forming the wall section of the bonnet-shaped moulded part, with a moulded-in zone for the pouring opening, and of an attachment section that is provided for forming the zone of the collecting channel on an edge side of the moulded part, with at least the attachment section comprising air suction bores for forming the collecting channel of the moulded part. Preferred features improving the invention in an expedient manner can be derived from additional disclosure provided hereinbelow.

Due to the inventive configuration of the device, definite advantages are achieved in terms of manufacture, use and utilisation. The bonnet-shaped, particularly conical or frusto-conical or pyramidal, moulded part expediently consists of a strong but flexible material such as PET, PE, PP or PC. In this manner, a sufficient mechanical strength is achieved to resist damage that could be caused by pointed objects. Moreover, there is no deformation under the influence of wind. The functional integrity is therefore not impaired by exterior weather conditions such as rain, wind and the like.

Due to the geometry of the moulded part, the invention provides the expedient feature that the condensate-collecting channel performs the function of a floating body at the same time when the device is employed on water surfaces. An additional floating body or buoyancy ring can therefore be dispensed with. The device can be expediently moulded as an integral part and in series so that it can be manufactured at a low price, which is particularly expedient for an application in developing countries.

The fact that the moulded part does not include a bottom with an evaporating section must be considered to be a further advantage. As a result, problems with algae and the formation of crusts are not created. The device is simple to clean and is ready for use immediately, without being inflated and without a supporting structure.

In accordance with another embodiment of the invention, a pouring opening is provided at the tip of the moulded part for pouring out the condensate. Being appropriately placed, this opening cannot be soiled, or water cannot flow out in an undesirable manner.

In correspondence with an expedient further embodiment of the invention, the pouring opening can be closed with a screw plug and can hence be intuitively used as a drinking bottle. At the same time, the device can also be used as rain-collecting receptacle after it has been turned upside down, due to its dimensionally stable design.

Finally, a further advantage of the provision of a preferably closable discharge opening in the upper section of the moulded part, particularly at the tip of a cone or a pyramid, resides in the fact that the moulded part as a whole must be tilted by 180° for pouring out the condensate. The quantity of the recovered drinking water can even be increased expediently by the condensate drops present on the inner wall, which can also be poured out.

According to a further embodiment of the invention, the moulded body is manufactured from two moulded parts disposed on top of each other, which are adapted to be fastened on each other in the bottom zone. As a result, a so-called double-wall structure is obtained, which permits the achievement of a particularly high efficiency in condensate recovery. To this adds the fact that any condensate dripping prematurely off the outside skirt is collected at the inner wall of the channel, which extends in parallel with the outside skirt, and does not drip off into the free bottom area. Another expedient aspect of the raised inner opening is the appropriate protection from the undesirable penetration of waves on which the device is floating.

All of the embodiments of the inventive device present a further advantage when the inner side of the circumferential surface is provided with a non-fogging coating and when its outside surface is resistant to scratching.

Apart from the simple manufacture, which involves only little waste, also the provision of holding openings is expedient for the device composed of two parts, particularly deep-drawn elements, which openings have the two functions of holding handles and of anchoring or fastening the device. Adhesives or other connecting means with bacteria- and algae-preventing substances are expediently provided for bonding the two moulded parts.

In all the embodiments of the inventive device, filter cartridges may be inserted in the zone of the pouring opening in order to filter out sand, dust, bacteria, etc. and/or mineral cartridges may be provided for the addition of minerals. When the bonnet surface, particularly the surface of the cone, is slightly vaulted, a higher stability is achieved. Eyes provided in the zone of the pouring opening below the collar contribute to the dimensional stability and are extremely resistant to tearing up in an expedient manner.

Moreover, in correspondence with another embodiment of the invention, the outside skirt may be enlarged by moulded-in zones and/or shaped raised sections, particularly in the form of grooves or corrugations, in order to enlarge the condensation area and to achieve better cooling. An additional heat-collecting effect may additionally be achieved with a cloth of material that is permeable to vapour, which cloth is stretched over the underside of the moulded body and prevents, at the same time, a contamination by the washing of the waves. Moreover, additional closable openings may be provided for drainage in the zone of the collecting channel.

In conclusion, the inventive device provides for a simple and intuitive handling, with the condensate-collecting channel not only providing an appropriate holding handle but also a floating aid, with a simple design. The device does not require maintenance, can be stacked and is ready for use immediately without any further attachments or superstructures.

Due to the envisaged moulded shape, the moulded bodies can also be safely stacked without any problems whilst the stacks so formed are easy to transport by means of a supporting rod projecting through the open pouring openings.

The inventive method of manufacturing a device for drinking-water recovery from condensate in correspondence with the features defined in claim 18 provides for a special vacuum treatment for the deep-drawing operation by additional lateral exhaustion in the zone of the collecting channel to be formed, as well as for a separation of the moulded part from a separated deep-drawing tool element outside the zone of the collecting channel. Due to the special additional exhaustion in the zone of the collecting channel to be formed, it is possible to shape expediently rearwards engaging sections of the moulded part completely in correspondence with the desired shape while the finished moulded part is simple to separate subsequently from a separated deep-drawing element. This method allows for an extremely simple and efficient production of devices, particularly devices with rotational symmetry.

The deep-drawing tool, which is additionally provided for carrying through the method presenting the features defined in claim 19, is expediently formed to comprise a principal section and an attachment section, which permits the moulding of the envisaged collecting channel at the edge side with a constant wall thickness and a constant outside contour. As a result, a rearwards engaging zone of the moulded part is well moulded, which would otherwise not be sufficiently considered in the application of a vacuum in the zone of the principal section. The air suction bores provided for forming the collecting channel are preferably formed in the attachment section and connected to suction air ducts in the principal section.

In correspondence with a preferred further embodiment, the attachment section presents a peripheral rounded mould edge for forming an inner edge of the collecting channel, with the attachment section preferably comprising a stop for a separating tool that is preferably formed on the rounded mould edge.

In correspondence with another embodiment of the invention, the attachment section has a bipartite configuration in order to be able to provide a manufacture of the suction air ducts, a suction plane and of suction air ducts in the attachment section.

BRIEF DESCRIPTION OF THE DRAWINGS

In the following, the invention will be explained in more details with reference to the attached drawings wherein:

FIG. 3 shows another embodiment of the invention for explaining the principle of operation;

FIG. 4 illustrates the embodiment according to FIG. 3 in a schematic section in a condition in which the condensate is poured out;

FIG. 5 is a view of another embodiment of an inventive device in which a black cloth permeable to water is stretched over the bottom area to provide protection from the washing of the waves and for achieving a greater evaporation heat;

FIGS. 16 to 18 show various geometries of collecting channels adapted to be stacked;

FIGS. 19 and 20 are schematic views of steps for the manufacture of an embodiment of an inventive device;

DETAILED DESCRIPTION OF THE INVENTION

Figure 1:
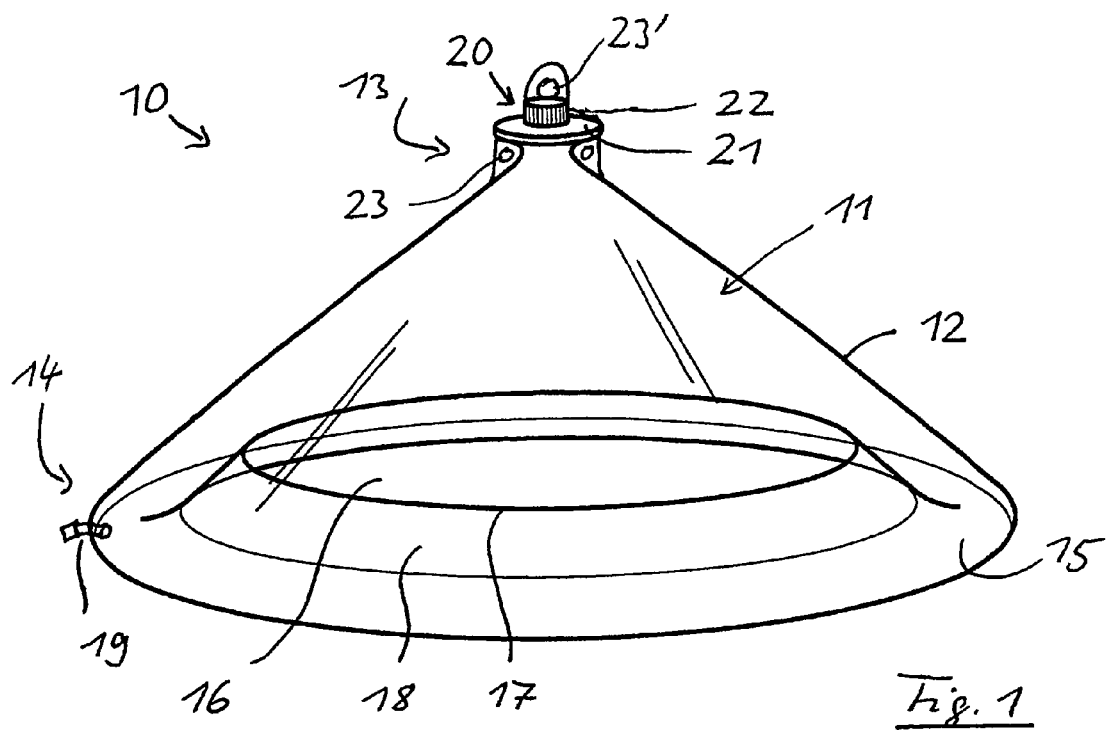
FIG. 1 is a perspective side view of a first embodiment of an inventive device.

FIG. 1 illustrates a first embodiment of an inventive device for recovering drinking water from condensate. The device 10 consists of a conical moulded part 11 presenting a circumferential surface 12 that extends from an upper section 13 of the moulded part to a lower section 14. The moulded part 11 is of rotational symmetry and consists of a transparent synthetic resin such as PET and PC.

In the lower section, an inwardly projecting collecting channel 15 is integrally formed on the edge side on the moulded part 11, which serves, at the same time, as floating aid. The collecting channel 15 surrounds an open bottom area 16 that is formed by the upper edge 17 and the inner wall 18 of the collecting channel 15. The inner wall 18 of the collecting channel 15 extends approximately in parallel with the circumferential surface 12.

Figure 2:
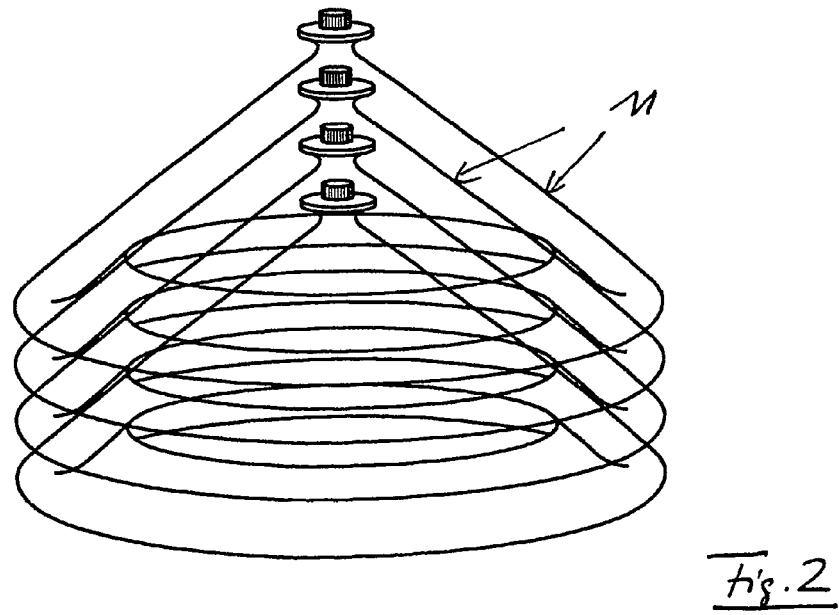
FIG. 2 is a schematic illustration of 4 devices according to FIG. 1, which are stacked on top of each other.

A drainage opening 19 is provided in the lower section of the collecting channel 15 for discharging the condensate in its entirety, which can be closed by means of a closing element not illustrated here. A pouring opening 20 is formed in the upper section 13 of the moulded part 11, which comprises a collar 21 on the outside as well as a threaded tubulure with a screw-on lid 22 as closing element. Additional lateral integrally formed parts 23 are moulded between the collar 21 and the circumferential surface 12 as well as upper integrally formed parts 23' on the cover, which serve to increase the stability in the upper section and serve as holding handle and for additional attachment. In the simplest basic form of the device according to FIG. 1, the device has only a configuration as roughly indicated in the stacked form in FIG. 2, with the stack of moulded bodies 11 according to FIG. 2 presenting an extreme dimensional stability and offering the possibility to pass a rod therethrough, after removal of the screw-on covers 22, for simple transportation. FIGS. 2 and 3 serve to explain more details of the handling of one embodiment of the inventive device. In variation from the embodiment shown in FIG. 1, this embodiment comprises a filter cartridge 24 in the zone of its pouring opening 20 while the inner wall 18 of the collecting channel is configured to extend in the direction towards the open bottom area as a peripheral protective edge 25 that serves as return stop for salt and waste water, as is schematically roughly indicated in FIG. 4 in the pouring condition.

As is illustrated in FIG. 3, the moulded part 11 is disposed either on a moist ground or on the surface of a water body. Under the influence of solar heat, the water is caused to evaporate in the zone of the free bottom area, with the water vapour depositing on the inner surface of the circumferential surfaces 12 in the form of a condensate and flowing down along the circumferential surface up to the collecting channel 15 under the influence of gravity. When a sufficient quantity of condensate has accumulated in the collecting channel 15 the moulded part 11 is seized by its upper section 13 and turned upside down so that the water accumulated in the collecting channel will flow out through the pouring opening 20 from which the cover 22 has been removed before. With a swinging movement of the moulded part, the remaining condensate quantity that has not yet flown down into the collecting channel 15 can be expediently collected and poured out, too.

In the embodiment shown in FIG. 5, the inner wall is shown to present a straight surface, in distinction from the schematic view in FIGS. 3 and 1, with the lower section of the moulded part 14 being flared in an appropriate form to the outside at the side of the edge for receiving cloth attachment means. The reference numeral 26 identifies a black cloth stretched over the free bottom area 16, which cloth is permeable to water and serves as protection against the washing of the waves and to achieve a higher evaporation heat.

Figure 6:
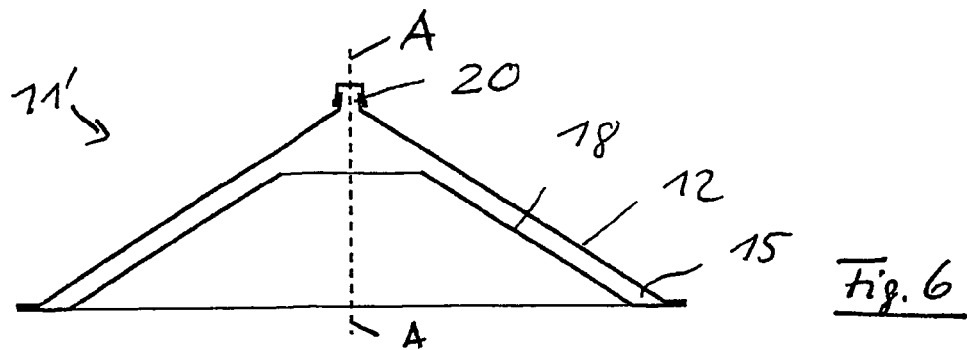
FIG. 6 shows a schematic view of a further embodiment of the invention.
Figure 7:
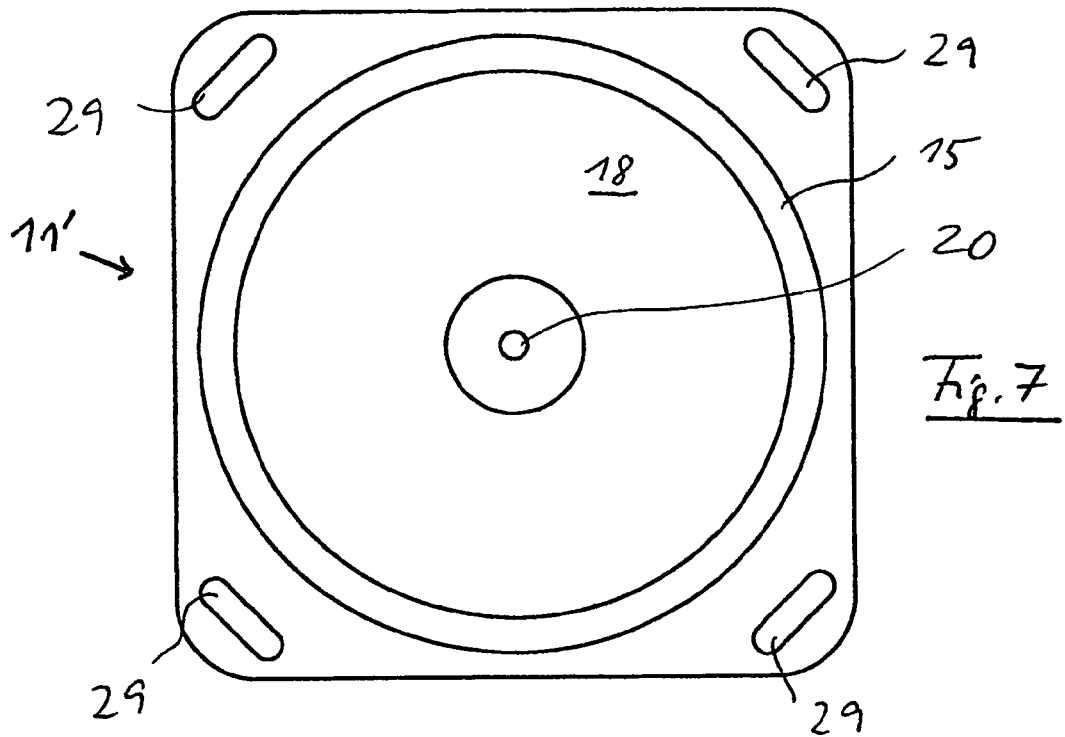
FIG. 7 is a view of the device according to FIG. 6 from below.
Figure 8:
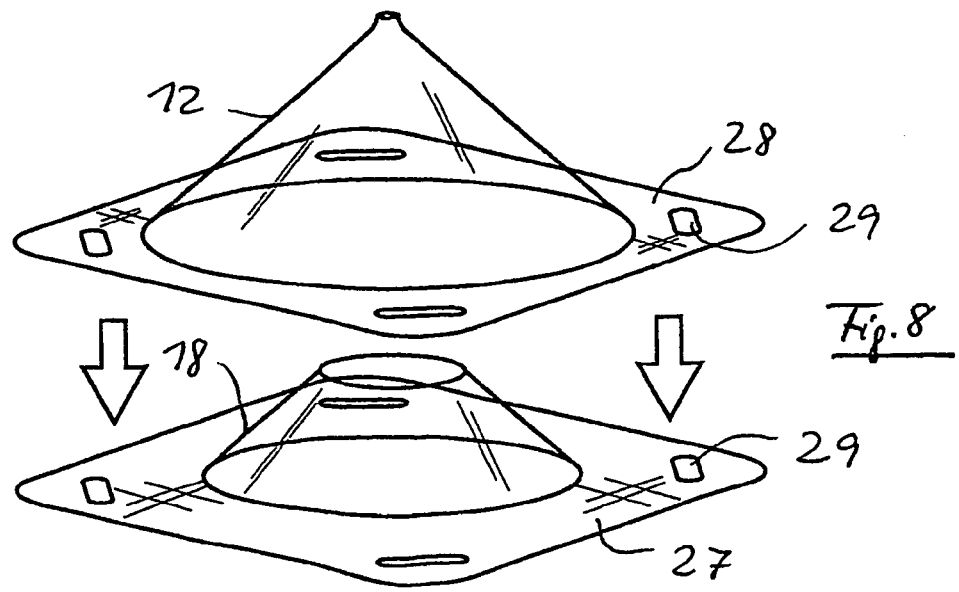
FIG. 8 is an illustration of the assembly of the device according to FIG. 6.
Figure 9:
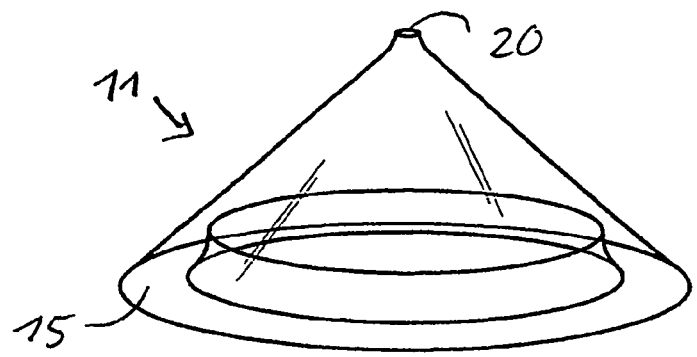
FIGS. 9 to 12 show various embodiments of devices presenting different geometries of the outside wall.
Figure 10:
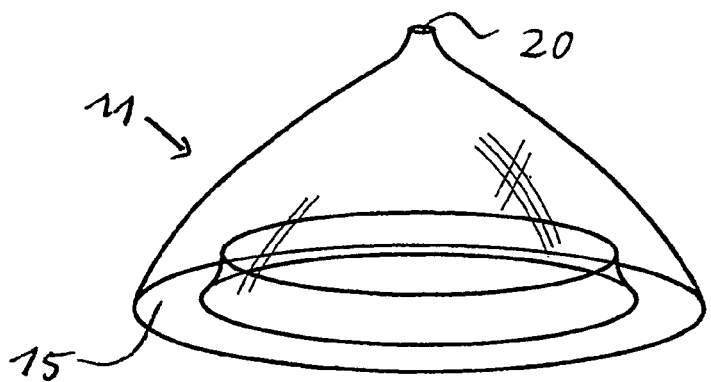

The FIGS. 6 and 7 are a schematic side view and a view from below of a double-walled moulded part 11' that consists of a lower moulded part 27 and an upper moulded part 28, as is shown in FIG. 8. The upper moulded part, and likewise the lower moulded part, is configured as a deep-drawn element and consists of a conical section that comprises an approximately square bottom section at its lower end, which extends in the lateral direction. The lower moulded part 27 has an equally approximately square bottom plate from which rises a frusto-conical integrally moulded part in the centre, which constitutes the inner wall 18 of the collecting channel 15. As can be seen in FIG. 6, the inner wall 18 and the outside skirt 12 extend approximately in parallel almost into the upper section 13 of the moulded part 11'. In operation of the device, condensate accumulates in the comparatively wide collecting channel 15 that is formed between the inner wall 18 and the outside skirt 12. The reference numeral 29 identifies continuous elongate holes serving as holding handles and as opening for fastening the device.

According to the illustration in FIG. 8, the upper moulded part 28 is centrally placed on the lower moulded part 27 and bonded there or fastened by appropriate locking means for the manufacture of the device according to FIGS. 6 and 7, with the holding openings 29 being aligned in both bottom sections. The two moulded parts 27 and 28 may also be connected to each other by means of a bacteria- and algae-preventing adhesive or silicone, respectively.

Figure 11:
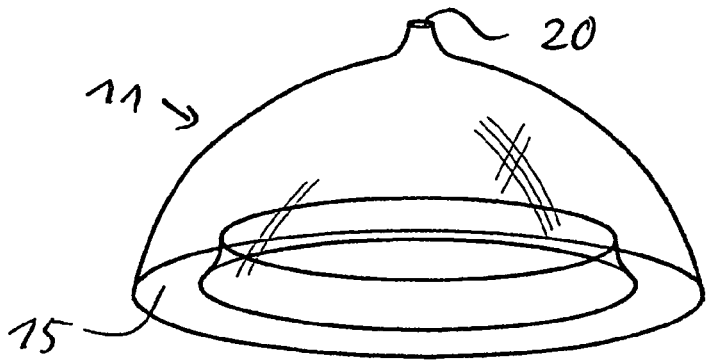
Figure 12:
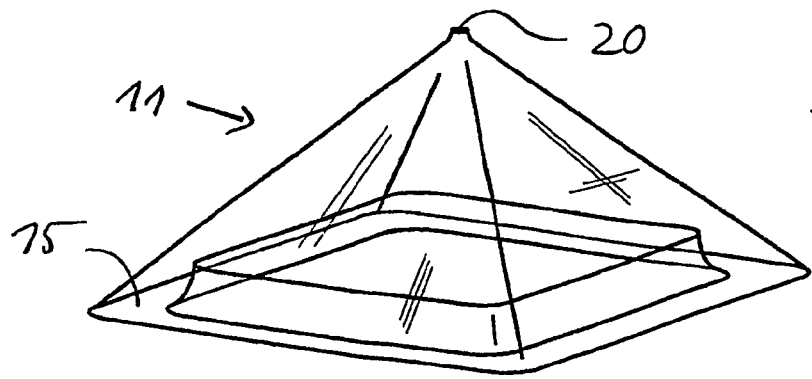

FIGS. 9 to 12 show various geometries of the outside wall of the moulded body 11, with additional integrally moulded parts such as the collar, the holding handle and the draining opening being omitted for simplification. According to FIG. 1, the device comprises a conical moulded part whilst according to FIG. 10, the circumferential surface is vaulted to the outside in the manner of a bonnet. This furnishes a further improvement of the stability. The configuration according to FIG. 11 is another possibility, with the circumferential surface presenting a shape similar to a hemisphere. The pyramidal configuration of the circumferential surface according to FIG. 12 provides for a maximum utilisation of the area.

Figure 13:
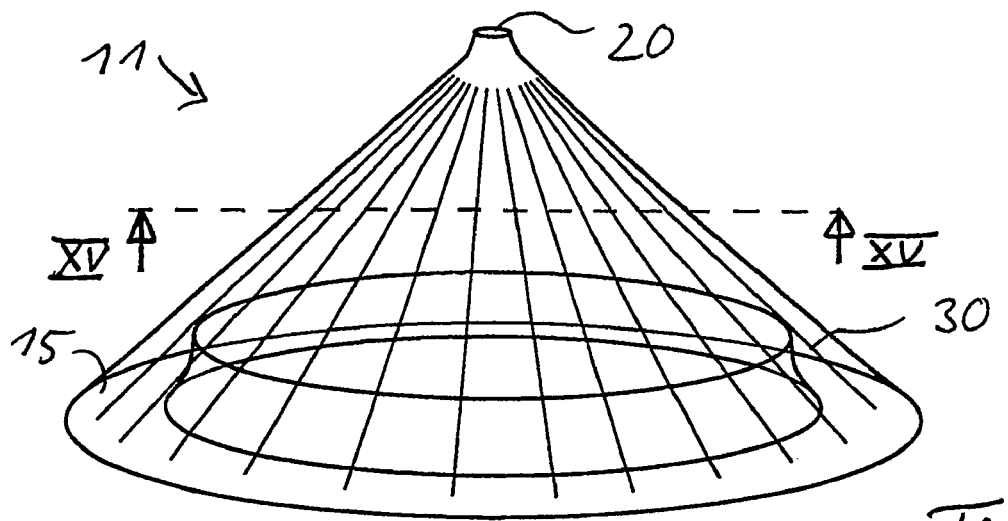
FIGS. 13 to 15 illustrate a schematic perspective side view, a view from below and a sectional view along the line XIII-XIII in FIG. 13.

In FIG. 13, the fact is schematically indicated in a device according to FIG. 11, that the circumferential surface may be enlarged by a zigzag-shaped design including grooves for an enlargement of the surface and in order to permit a better control of the down flow of the condensate drops. It is also possible to provide some other integrally moulded-in guiding elements instead of the illustrated grooves 30, which extend from the upper section 13 to the lower section 14 of the moulded body 11.

Figure 14:
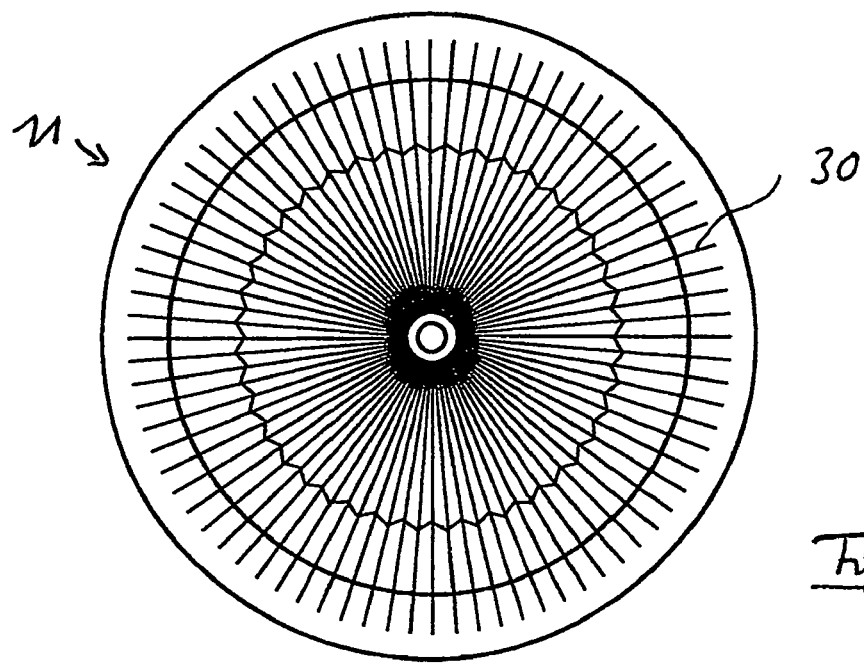
Figure 15:
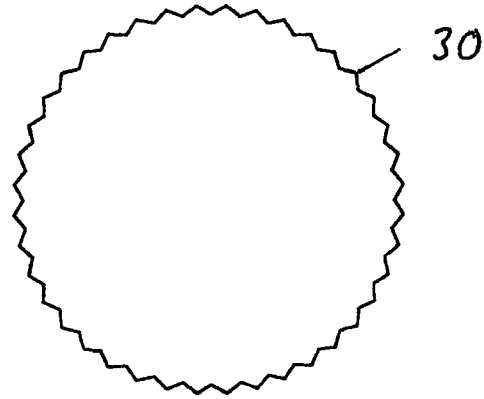

FIG. 14 shows a view from below of the device according to FIG. 13, and FIG. 15 roughly indicates the sectional profile extension along the line XV-XV in FIG. 13 in a schematic form.

The FIGS. 16 to 18 illustrate various geometric shapes of collecting channels for reliable and safe stacking of moulded bodies 11. In the lower section of the circumferential surface 12 as shown in FIG. 16 a peripheral moulded-in section 31 is provided that serves to receive a section 32 of the collecting channel 15 having a complementary curvature.

According to FIG. 17, the lateral shaping of holding sections in a manner similar to the embodiment of according to FIG. 5 ensures that the devices can be stacked in a reliable manner in the precise position because here the lower surface 33 of the upper moulded body rests on the upper horizontal surface 34 of the lower moulded body.

FIG. 18 shows a further embodiment that provides for proper stacking of the moulded parts 11, wherein the inner wall 18 extends in parallel with the circumferential surface 12 and is supported like a sheet.

For the manufacture of a device according to the embodiment illustrated in FIG. 5, the FIGS. 19 and 20 illustrate the appropriate steps of operation. FIG. 19 is a schematic view of a blow-shaped moulded part without a collecting channel. The moulded part 11 is provided with an open section 35 tapering in a conical shape in a downward direction and having a bottom part that is subsequently cut away. As is illustrated in FIG. 20, then the section 35 is swung in after heating or tilted upward as inner wall 18.

Figure 21:
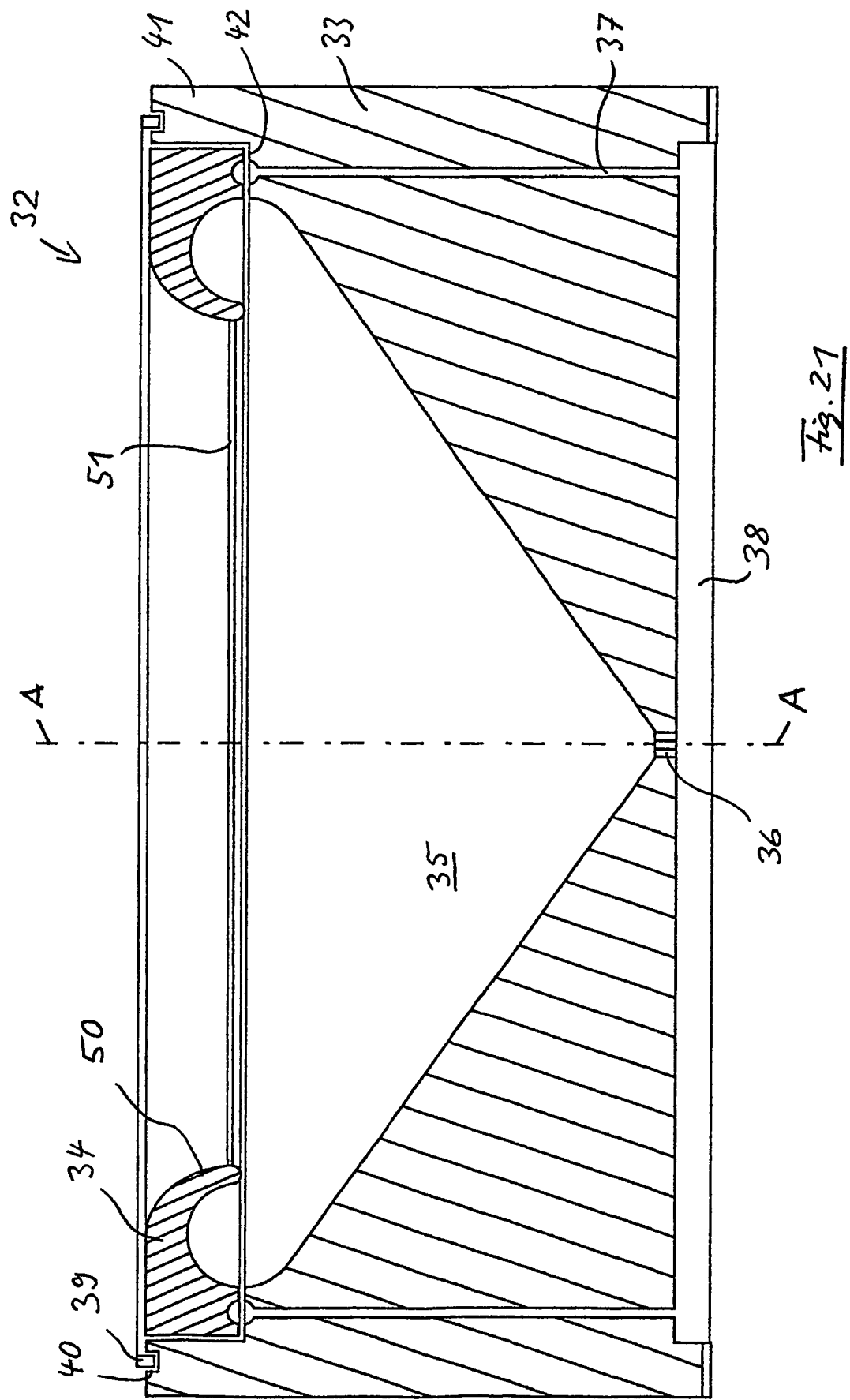
FIG. 21 shows a schematic sectional view taken through an embodiment of an inventive deep-drawing tool for the manufacture of a device presenting rotational symmetry.

Now an embodiment of the inventive deep-drawing tool as well as the method of manufacturing a device for recovery of drinking water from condensate will be explained in more details with reference to FIGS. 21 to 27. FIG. 21 illustrates a schematic section taken through a deep-drawing tool 32 of rotational symmetry, which consists of a principal section 33 and an attachment section 34. In the principal section 33, a cavity 35 for forming the wall section of a bonnet-shaped moulded part, a moulded-in zone 36 for a pouring opening of the moulded part, lateral suction ducts 37, which lead from a suction cavity 38 provided in the lower section of the principal section 33 to the attachment section 34, as well as a peripheral seal 39 are illustration, which is disposed in a recess 40 that is provided on the upper side of a peripheral edge section 41 at the upper end of the principal section 33. The edge section 41 extends up to a shoulder 42 that constitutes a bearing surface for the attachment section 34. Like in FIGS. 19 and 20, the line A-A identifies the axis of symmetry or rotation, respectively, of the moulded body to be produced.

Figure 22:
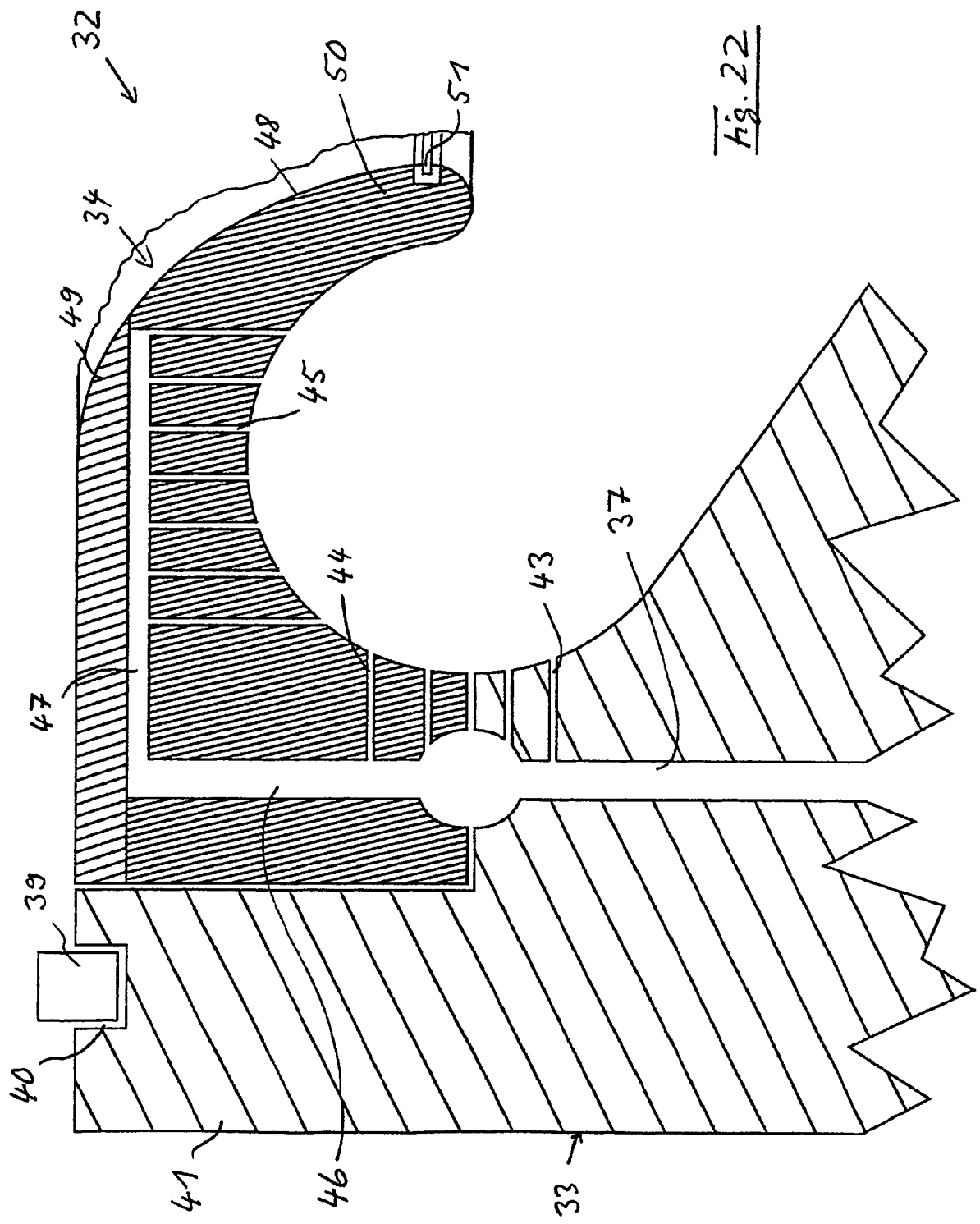
FIG. 22 is a partial sectional view at an enlarged scale in the upper left area in FIG. 21 for the illustration of air suction bores.
Figure 23:
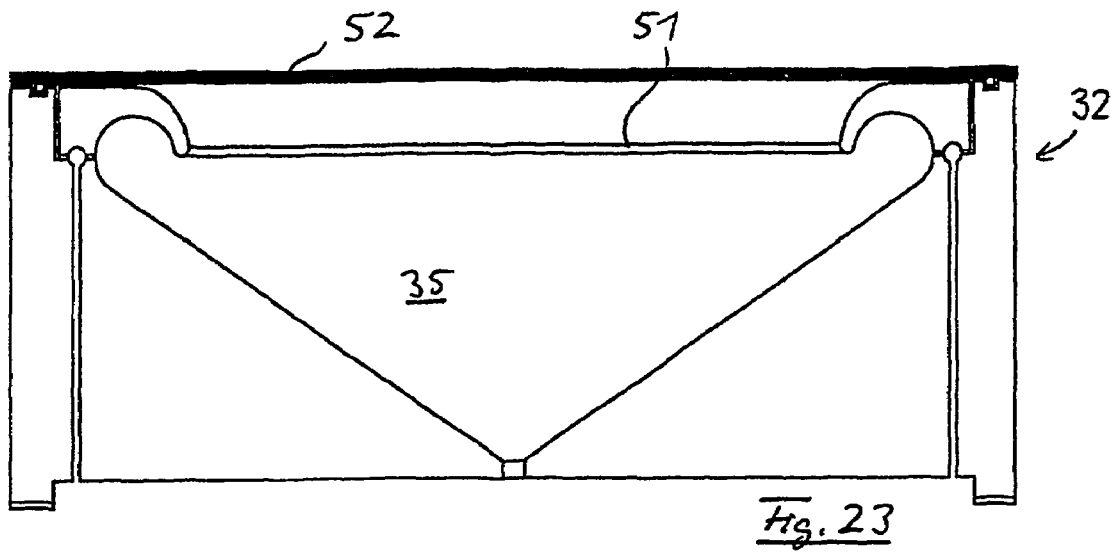
FIGS. 23 to 27 illustrate individual steps in the manufacture of one embodiment of the inventive device, using an inventive deep-drawing tool.
Figure 24:
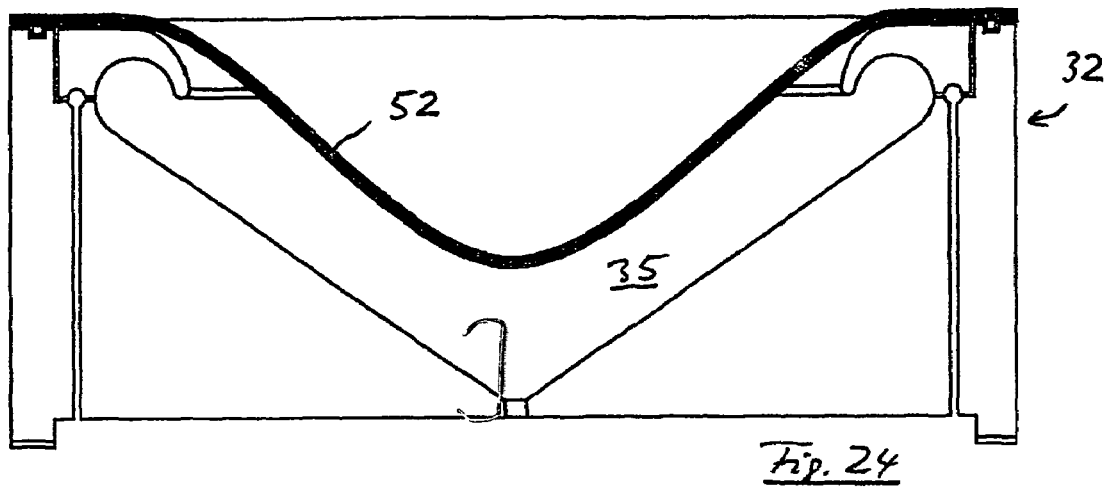
Figure 25:
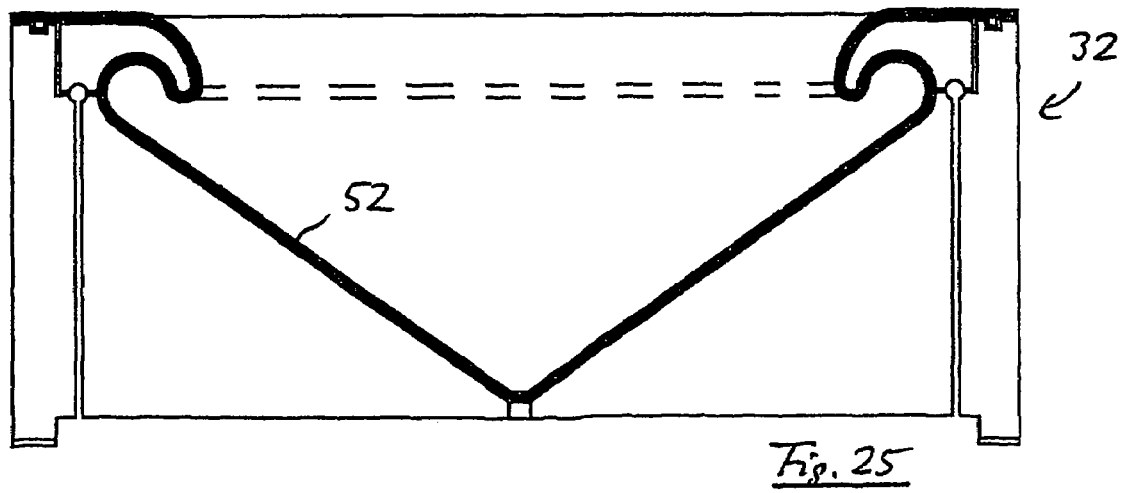

FIG. 22 is an enlarged sectional view of further details in the area of the left upper section of the deep-drawing mould 32. Here, air suction bores 43 to 45 can be seen particularly clearly, which open into the zone of the collecting channel to be formed in the moulded part. Here, the suction bores 43 are still formed in the principal section 33 and open directly into the annular suction duct 37 whilst the ducts 44 and 45 lead to the air suction duct 46 or to a suction cavity 47, respectively, which is connected to it. For reasons of manufacturing technology, here the attachment section 34 is formed with a principal section 48 and a cover-shaped annular part 49 that closes the suction cavity 47 at the top. The principal section 48 is provided with a peripheral rounded mould edge 50 that has a finger-like cross-sectional area in the sectional view of FIG. 22. The reference numeral 51 identifies a stop moulded in the mould edge for a separating tool. This stop serves to separate the moulded part from the attachment part 34 after removal from the conical funnel or cavity 35, respectively, of the mould. The outside contour of the mould edge 50 is rounded so that as much material as possible can be drawn into the interior space in the zone of the collecting channel to be produced on the edge side of the moulded part during the deep-drawing operation, without tearing the material.

The inventive method will now be described with reference to the schematic views in FIGS. 23 to 27 in more details. In the starting position according to FIG. 23, in a first step of operation, a heated sheet 52 made of a thermoplastic transparent synthetic resin with a seal on the edge side is placed on the schematically illustrated deep-drawing tool 32. Then, a vacuum is applied in the deep-drawing tool 32 for shaping the sheet 52, with the sheet 52 being shaped into the deep-drawing tool 32 according to FIG. 24 and then according to FIG. 25, whilst the vacuum being extracted through the opening 36 (FIG. 21) of the principal section 33 as well as through the air suction bores 43 to 45, which are explained in FIG. 22, in the zone of the collecting channel to be formed on the edge side of the moulded part.

Figure 26:
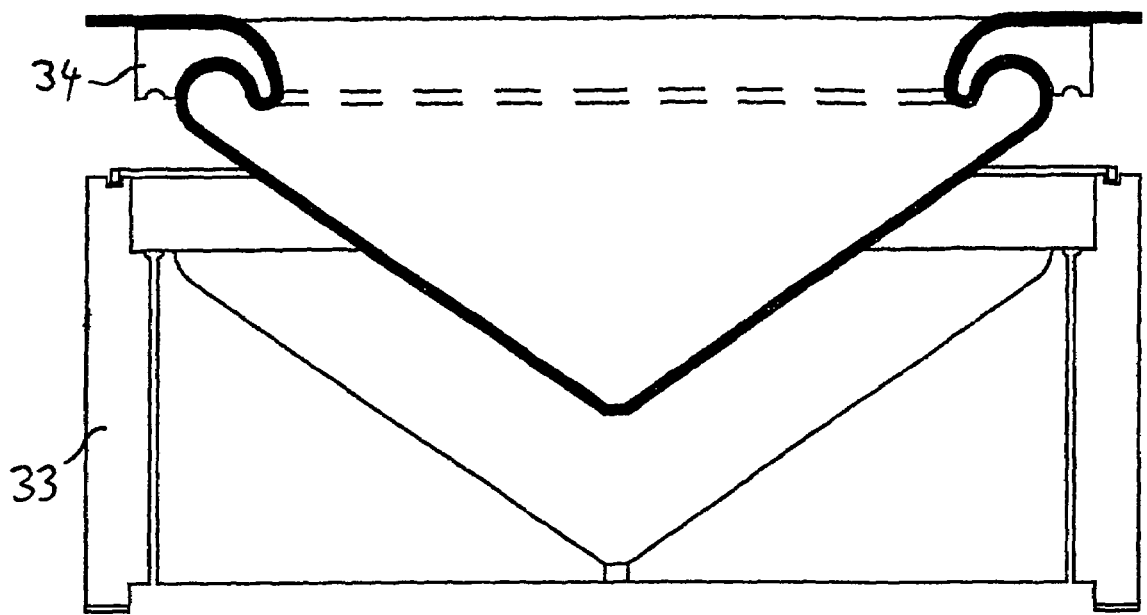
Figure 27:
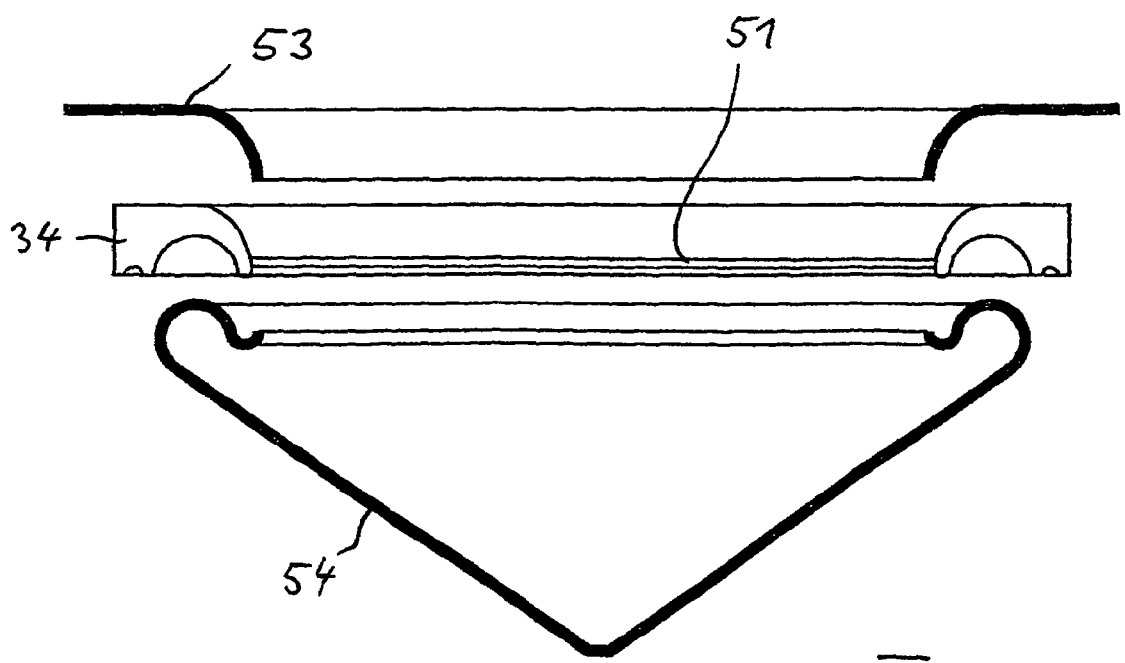

According to FIG. 26, then the cooled moulded part is removed from the principal section 33 of the mould, together with the attachment section 34, and in the last step, the moulded part is then separated along the stop 51, which furnishes, on the one hand, a section 53 of the moulded part and, on the other hand, the finished moulded part 54, both detached from the attachment part 34.

What is claimed is:

1. Device for recovering drinking-water from condensate, consisting of a bonnet-shaped self-supporting moulded part made of a transparent synthetic resin being resistant to ultraviolet (UV) radiation, said moulded part comprising in its lower section an open bottom area with a collecting channel on a side of an edge thereof, said collecting channel having an inner wall oriented towards a circumferential surface, and said moulded part having a pouring opening in its upper section, wherein at least one moulded holding element is formed in the upper section for holding and supporting the moulded part, the moulded holding element being designed as a collar.

2. Device according to claim 1, wherein the inner wall of said collecting channel presents a section extending approximately in parallel with a conical circumferential surface.

3. Device according to claim 1, wherein an upper edge of said inner wall of said collecting channel is shaped in a direction towards the open bottom area.

4. Device according to claim 1, wherein said pouring opening is disposed to extend coaxially relative to a center axis A-A of said moulded part.

5. Device according to claim 1, wherein a removable cap is provided for said pouring opening.

6. Device according to claim 5, wherein said cap is configured as a screw cap that can be screwed onto a threaded section on said pouring opening.

7. Device according to claim 1, wherein a filter and/or mineral-adding means can be inserted into said pouring opening.

8. Device according to claim 1, wherein an angle of inclination of said circumferential surface of a moulded body having conical or frusto-conical shape amounts to 30°.

9. Device according to claim 1, wherein said circumferential surface of said moulded body is vaulted to the outside.

10. Device according to claim 1, wherein the inner side of said circumferential surface presents surface-enlarging moulded-in and/or moulded guiding elements that extend from the upper section to the lower section of said moulded part.

11. Device according to claim 1, wherein said moulded part is made of two moulded parts disposed one on top of the other, which are adapted to be fastened on each other in the respective bottom zone.

12. Device according to claim 11, wherein said upper moulded part presents an outer skirt and a flat bottom section while said lower part presents a flat bottom section and an inner wall of said channel.

13. Device according to claim 11, wherein holding openings are provided on at least one bottom section.

14. Device according to any of the claims 11, wherein the side of the inner wall of a groove, which faces a flat bottom area, is provided with a non-fogging coating.

15. Device according to claim 1, wherein a black water-permeable cover is provided for said open bottom area.

16. Method of manufacturing a device according to claim 1, comprising the following steps of operation:
  (a) arranging a heated sheet of a thermoplastic transparent synthetic resin with a sealing on the edge side on a deep-drawing tool;
  (b) applying a vacuum in said deep-drawing tool in the zone of the circumferential surface to be formed on said moulded part and additionally in the zone of the collecting channel to be formed;
  (c) removing the moulded part from the mould together with a deep-drawing tool element that is located in the zone of the collecting channel to be formed; and
  (d) separating the moulded part from the separated deep-drawing tool element outside the zone of said collecting channel.

17. Device according to claim 1, wherein the device is produced by deep-drawing by means of a deep-drawing tool, which comprises a principal section, in which a cavity is provided for forming the wall section of said bonnet-shaped moulded part, with a moulded-in zone for the pouring opening, and an attachment section that is provided for forming the zone of said collecting channel on the edge side of said moulded part, with at least said attachment section comprising air suction bores for forming said collecting channel of said moulded part.

18. Device according to claim 17, wherein said attachment section comprises at least one suction air duct that is connected to said air suction bores.

19. Device according to claim 17, wherein said attachment section further comprises a peripheral rounded mould edge for forming an edge of said collecting channel.

20. Device according to claim 17, wherein said attachment section comprises a stop for a separating tool.

21. Device according to claim 20, wherein said attachment section further comprises a peripheral rounded mould edge for forming an edge of said collecting channel, and wherein said stop is formed on said peripheral rounded mould edge.

* * * * *